March 26, 1957 H. DE FRANCE 2,786,887

REDUCED BANDWIDTH TELEVISION SYSTEM

Filed May 14, 1951 2 Sheets-Sheet 1

Inventor
Henri de France
By Ralph B. Stewart
Attorney

March 26, 1957 H. DE FRANCE 2,786,887

REDUCED BANDWIDTH TELEVISION SYSTEM

Filed May 14, 1951 2 Sheets-Sheet 2

Inventor
Henri de France
By Ralph B. Stewart
attorney

United States Patent Office 2,786,887

Patented Mar. 26, 1957

2,786,887

REDUCED BANDWITH TELEVISION SYSTEM

Henri de France, Paris, France, assignor to Societe Nouvelle de l'Outillage R. B. V. et de la Radio-Industrie (R. B. V.-R. I.), Paris, France, a joint-stock company Application May 14, 1951, Serial No. 226,175

Claims priority, application France June 6, 1950

3 Claims. (Cl. 178—6.7)

The present invention relates to a process, and means for putting it into practice, for transmitting television pictures with a reduced frequency bandwidth, without impairing the picture qualities which are fundamentally assumed by the choice of a suitably high definition, especially as concerns the number of lines per frame and further by the provision of two interlaced scanning frames for building up each picture.

The persistence of vision of the observer of a reproduced picture is always higher than the picture duration for the picture frequency adopted usually in television of 1/25 or 1/30 of a second per complete picture in two frames of 1/50 or 1/60 of a second or of 1/24 of a second for a kinematographic film picture. In practice, experiments have proved that a kinematographic film in which a frame picture has been suppressed and replaced by the reproduction of the preceding frame picture cannot be discerned by the spectator from the original film, and even the discrimination was very difficult between an ordinary film and a film in which two picture frames have been replaced by reproductions of the preceding picture frame.

It is obvious that the bandwidth necessary to transmit an information signal fundamentally depends on the rapidity with which this information is to be transmitted, and this depends on the picture scanning duration as far as television is concerned: an increase of this duration, and a lowering of the rate of the picture signals, allows the use of frequency bands of correspondingly reduced width, suitable for use, for example, to transmission with high frequency telecommunication cables of the type mentioned below. Nevertheless, it is imperative the signal applied on a reproducer set be permanent because the picture screen could not have the necessary remanence, because a too great a remanence would injure the quality of the picture leaving some spectra of the previous views; besides, this remanence is not free of a noticeable fading of luminosity with time, so that the luminosity would flicker at a continuous rhythm, to annoy the spectator.

Further a broadcasting of a television signal from a point remote from the studio where it is first generated, shall necessitate a link through a high frequency telecommunication cable such as a coaxial cable.

It is well known that such a telecommunication cable, or broad band cable, is not practical for the transmission of signals covering a frequency band of about 6 mc./s. or wider, because in practice, the use of such a link will require a prohibitive number of repeating stations, at least for long distances, the interval between repeating stations being of the order of 10 kms. Further, television frequency bands, for high definition qualities, require less narrower bands and it will be more difficult to handle such signals through these cables.

The object of the invention is to provide a process, and means, for carrying it into practice, to enable, however such transmissions of television signals on reduced bandwidth channels. Said process and means will be described with reference to the attached drawings, in which.

Considering the development in time of a complete television transmission signal, this signal is shown resolved into the successive elementary signals of the scanning rasters, alternately even and uneven, of the picture or views at the usual rate of 1/50 second of recurrence of the rasters therefore at the frequency of 1/25 second of recurrence of the pictures or views, and finally is shown reproduced by the superposition of two interlaced even and uneven rasters.

Figure 1:
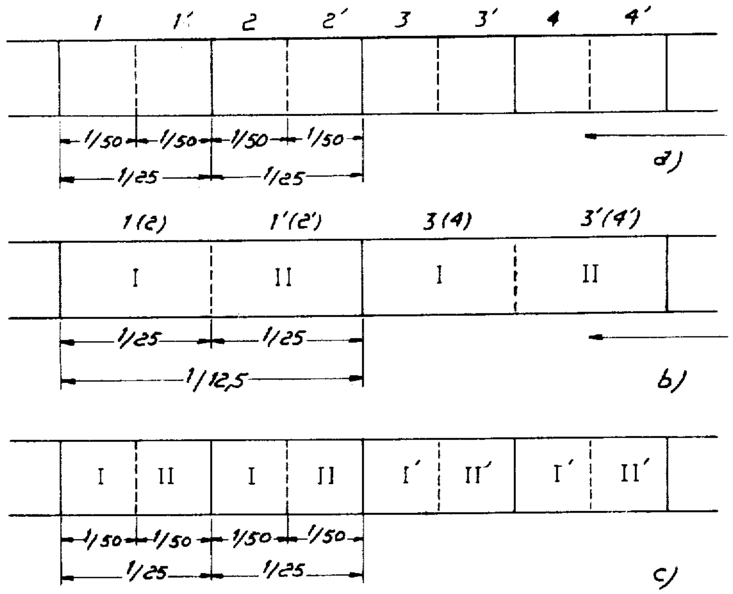
Figs. 1 and 2 are graphs representing alternative modes of operation according to the invention.

Such a series of rasters in time $1-1^1$, $2-2^1$, $3-3^1$, $4-4^1$, . . . is indicated at (*a*), Fig. 1. Each raster is, as will be understood analysed with one half the number of lines implied by the analysis definition of a picture, the simple numerals (such as 1) indicating the uneven rasters and those modified by a dash (such as $1^1$) indicating the even ones.

In order to reduce the frequency band width necessary for the transmission of such a series of rasters, for example to reduce the necessary passband of wave frequencies to about half its width, it is convenient to be able to reduce the rate of recurrence of the rasters to a half value, and, in consequence thus to permit a scanning of each raster in 1/25 of a second; a picture signal comprising the signals of two rasters in succession, even and uneven lasting therefore 1/12.5 second.

Through ensuring a recording which eliminates one picture signal in two, either by suppressing the recording of this signal, or by superposing the said signal on the signal of the preceding picture, there will be available a time of 1/25 of a second per raster namely 1/12.5 second per picture, for reanalysing this recording at the same definition, in proportion as it is established, into its two rasters I and II, $I^1$ and $II^1$, . . . per picture, as shown in graph (*b*) Fig. 1, comparatively with the graph (*a*), same figure. It must be understood that these graphs relate to the unsuperposed signals themselves, and not to the recordings in which the parts such as I–II, $I^1$–$II^1$ are superposed. The same applies to the graph (*c*) of Fig. 1.

This graph (*c*) shows the result of the signals generated by the scanning, at the rate of the sequence of the graph (*a*), of a second recording effected starting from the signals of the graph (*b*) in which each signal I–II has been repeated once, so that the sequence I–II–I–II–$I^1$–$II^1$–$I^1$–$II^1$, . . . of the graph (*c*) again takes up the rate of the sequence (*a*); although, however, the number of rasters therefore of pictures, and their durations, are the same in the two sequences (*a*) and (*c*), namely 1/50 second per frame, therefore 1/25 second per picture, the sequence (*c*) differs from the sequence (*a*) in that the contents of the pictures I–II, $I^1$–$II^1$ . . . are repeated twice in an accurate manner, whereas there existed or could have existed a slight inaccuracy in this content in the sequence (*a*) in the pictures $1-1^1$ and $2-2^1$, $3-3^1$ and $4-4^1$, . . .

The "shrinkage" of the number of pictures in the recording delivering the signal according to the graph (*b*) can, obviously, be effected in two ways, one way consisting in suppressing any recording of the pictures $2-2^1$, $4-4^1$ . . . in the signal of the graph (*a*), the other consisting in superposing the recording of the pictures $1-1^1$ and $2-2^1$, $3-3^1$ and $4-4^1$, . . . From the point of view of the final result, these two embodiments are strictly equivalent for the viewer.

Figure 2:
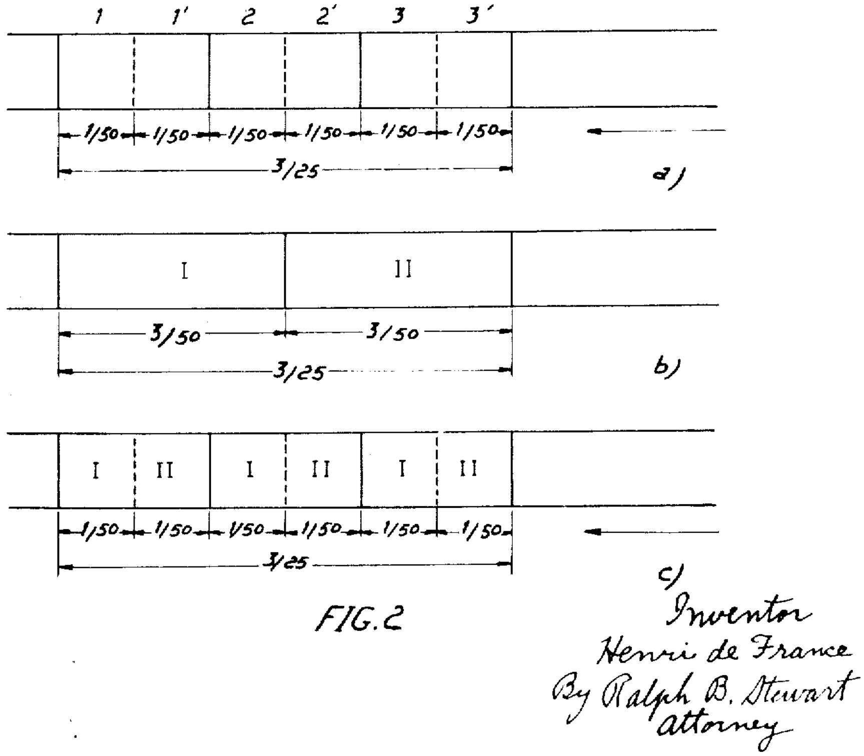

In order to operate at a still smaller band of wave frequencies, but however in such a way as to always ensure a service of satisfactory quality, it is possible, as a variant, Fig. 2, to have recourse to the "shrinkage" of three pictures into one when the first recording is being effected, then to the reciprocal "expansion" by triplicating the pictures in the second recording. In this case, in order to preserve a certain recurrence of the pictures, in the case of selective prior removal and not of superposition, there is produced the recording giving the graph (*b*), Fig. 2, by a sequence of raster signals such as $1-2^1-4$. . . .

In the case of the Fig. 2, the available time to scan each complete picture corresponding to the graph (*b*) is $3/25$ of a second.

Figure 3:
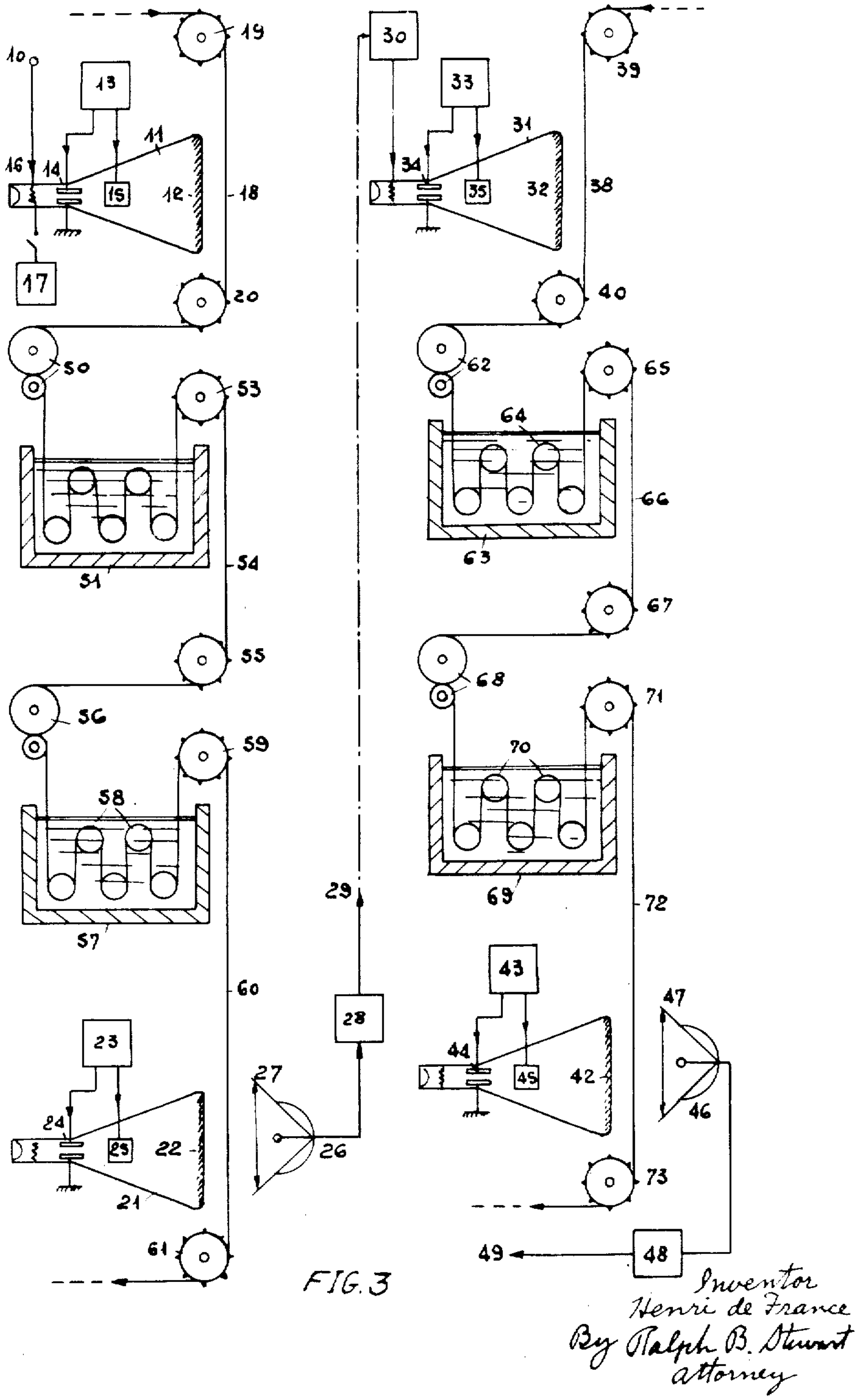
Figure 3 is a schematic diagram showing one arrangement providing for intermediate recording on a kinematographic film, at both the transmitting station and the receiving station.

Fig. 3 shows an arrangement using a photographic film for the "contraction" and "dilation" in the time of the frame and picture signals.

The signal according to the graph (*a*), Fig. 1 and Fig. 2 coming in at 10 is applied onto the control electrode of a reproducer tube 11 of which the beam thus modulated in intensity scans the fluorescent screen 12 at a line speed and rate of picture determined by the scanning circuits 13 which supply the potentials of vertical and horizontal deflections of the modulated beam, respectively applied for instance on the pair of deflection plates 14 and 15. The beam control electrode 16 can receive, besides the television signal coming in at 10, timed blocking pulses supplied from an interrupter circuit 17.

The control of this reproduction can take place of course, either directly at the studio itself, or at a remote location by transmitting from this studio a complete television signal, with line and pictures synchronising pulses which are separated from the video signal before said video signal, is applied at 10 and are used for synchronising the time basis of the scanning circuit 13.

On the screen 12 of the reproducer tube a picture appears with the definition of the input signal and, for example, assuming first the periodic blocking 17 is not operating, the pictures substitution rate of this picture is the same one as the rate of the pick up or the same one as the rate of the sequence (*a*) Fig. 1 or Fig. 2.

In front of the fluorescent screen 12 there moves a cinematographic film 18, driven by the feed sprockets 19 and 20, the virgin film leaving the sprocket 19. Its drive is effected so that the film 18 is stationary in front of the screen 12 for a period of $1/12.5$ second per picture, namely at a rate of passage one-half of the repetition rate of the pictures on the screen 12. Consequently, the picture signals corresponding to two successive pictures $1-1^1$ and $2-2^1$, etc. . . . are superposed on the screen 12 during the stoppage of one picture of the film 18 in front of the screen, and the cinematographic image thus obtained will add the details $1-1^1+2-2^1$. The impressed picture is driven on and, after quick development in any known apparatus through which it passes, it arrives, at the repetition rate above described, and stops for $1/12.5$ second in front of the screen 22 of an analysing oscillograph 21. The beam of the oscillograph 21 is controlled for the purpose of scanning the screen 22 with a spot which is not modulated but is moved according to the raster defined by the scanning circuit 23, controlling the deflector elements 24 and 25, so that in $1/12.5$ second this spot provides a complete scanning of the image in two interlaced rasters I and II, sequence (*b*), Fig. 1.

The brilliance of the spot, modulated in a manner well known, on passing through the impressed cinematographic film is directed to a photoelectric cell 26 through a concentrating optical device 27. The light variations are thus translated into a variation of the output voltage of the cell, amplified at 28 and transmitted at 29 over a co-axial cable link to the distant receiving station; the frequency band will then be that which corresponds to a raster rate of $1/25$ second and a picture rate of $1/12.5$ second, one-half of the rate of the original signal, sequence (*a*).

At the receiver, the vision signal amplified at 30 is fed to a receiving tube 31 in such a way that the picture generated by the modulation of the brilliance control electrode 36 and distributed over the luminescent screen 32 by the deflector devices 34 and 35 controlled by the scanning circuits 33 to produce a normal television picture having interlaced rasters I and II, sequence (*b*) is projected on to a virgin cinematographic film driven by the sprockets 39 and 40. This film 38 stops for $1/12.5$ second in front of the screen 32, is then driven and, after passage in a quick developer arrives in front of the screen 42 of a second oscillographic tube 41, the spot of which, unmodulated, is deflected by the deflectors 44 and 45 controlled from the scanning circuits 43 in order to analyse the cinematographic picture impressed on the film at a total rate of $1/25$ second, in two interlaced rasters of $1/50$ second. Thus each impressed picture is analysed twice, and the electric signal, leaving the cell 46 on which is projected the spot modulated by its passage through the impressed picture, repeats twice the details of the same picture I–II, as shown on the sequence (*c*) of Fig. 1. This signal is amplified at 48 and directed at 49 towards the retransmission apparatus of normal definition and having a band width for operating appropriate domestic receivers.

The operation which is just described is not substantially modified if a periodic blocking circuit 17 is operated to prevent the recording of one complete picture or view of each two pictures, for example it may prevent the recording on the film record 18 of frame signals 2′–2′ and 4′–4′.

This general operation is not appreciably modified and the results are still satisfactory in the case where two pictures of three are eliminated at the first recording, as indicated on the Fig. 2 (the pictures 2–2′ and 3–3′ are omitted), by feeding films 18 and 38 with a $3/25$ of a second rate, the periodic blocking circuit 17 being used or not as desired. The scanning time of the final reproducer tube 41 is not modified, so that the spot reproduces three times successively the same picture, graph (*c*), Fig. 2.

In alternative to this last exploration mode, the blocking circuit 17 can be operated so that the film 18 records the first frame 1 of the first picture, then the second frame 2′ (interlaced with the first one) of the second picture, and so on, one picture of three being entirely eliminated.

I claim:

1. A television transmission system which comprises in combination means for building up a television video signal at a definite picture rate of scan, recording means for continuously recording said video signal upon a photographic film, means in said recording means for omitting one complete picture for each given number of successive pictures carried by said signal, developing means continuously receiving said film from said recording means and developing the film by a quick process, means continuously receiving said developed film from said developing means and for continuously scanning said developed film at a picture scanning rate lower than said definite rate in the ratio of one to this given number and for deriving from said film a further video signal at said lower rate of scan, means for transmitting said further video signal through a reduced frequency bandwidth medium, means for receiving said transmitted signal, means for continuously recording said received signal on a second photographic film, developing means continuously receiving said second film from said recording means and developing the second film by a quick process, means continuously receiving said second film from said second developing means and for continuously scanning said second film at said definite scanning rate and means for deriving from said scan a final video signal.

2. A television transmission system which comprises in combination means for building up a television video signal at a definite picture rate of scan, electro-optical means for continuously recording said signal onto a kinematographic film driven at a rate which ensures the superposition on the film of at least two successive complete pictures, means for developing said record by a quick process, optical means for continuously scanning said developed film at a picture rate of at least half the rate of scan of the build-up television signal, means for deriving from said scan an electrical video signal of such a reduced scanning rate, means for transmitting said derived video signal through a reduced frequency bandwidth medium, means for receiving said transmitted signal, electro-optical means for continuously recording said received signal onto a second kinematographic film, driven at a corresponding rate, means for developing said second film by a quick process, optical means for scanning said second developed film at the first rate of scan and for deriving from said scanning a final video signal.

3. A television transmission system which comprises in combination means for building up a television video signal at a definite picture rate of scan, electro-optical means for continuously recording said signal onto a kinematographic film driven at a rate which would ensure the superposition on the film of at least two successive complete pictures, means for blocking the operation of said electro-optical recording means at least during a complete picture of two successive complete picture signal elements, means for developing said record by a quick process, optical means for continuously scanning said developed film at a rate of at least half the rate of scan of the build-up television signal and for deriving from said record an electrical video signal of such a reduced scanning rate, means for transmitting said derived video signal through a reduced frequency bandwith medium, means for receiving said transmitted signal, electro-optical means for continuously recording received signal onto a second kinematographic film driven at a corresponding rate; means for developing said second film by a quick process, optical means for scanning said second developed film at said definite rate of scan and for deriving from said second film a final video signal.

References Cited in the file of this patent

UNITED STATES PATENTS

| | | |
|---|---|---|
| 1,775,241 | Horton | Sept. 9, 1930 |
| 1,990,544 | Gray | Feb. 12, 1935 |
| 2,219,021 | Riesz | Oct. 22, 1940 |
| 2,273,172 | Beers | Feb. 17, 1942 |
| 2,517,265 | Wald | Aug. 1, 1950 |

FOREIGN PATENTS

| | | |
|---|---|---|
| 428,227 | Great Britain | May 9, 1935 |

UNITED STATES PATENT OFFICE

CERTIFICATE OF CORRECTION

Patent No. 2,786,887

March 26, 1957

Henri de France

It is hereby certified that error appears in the printed specification of the above numbered patent requiring correction and that the said Letters Patent should read as corrected below.

Column 5, line 21, after "first" insert -- mentioned definite --; line 22, for "scanning" read -- second film --.

Signed and sealed this 7th day of January 1958.

(SEAL)

Attest:

KARL H. AXLINE

Attesting Officer

ROBERT C. WATSON

Commissioner of Patents